United States Patent
Tsai et al.

(10) Patent No.: US 6,928,038 B2
(45) Date of Patent: Aug. 9, 2005

(54) CIRCUIT FOR PROTECTING SYNCHRONIZING PATTERNS

(75) Inventors: Chao-Long Tsai, Hsin Chu (TW); Andrew Chang, Hsinchu (TW); Szu-Shan Lo, Hsinchu (TW)

(73) Assignee: Media Tek Inc., Hsin Chu (TW)

( * ) Notice: Subject to any disclaimer, the term of this patent is extended or adjusted under 35 U.S.C. 154(b) by 484 days.

(21) Appl. No.: 10/139,506

(22) Filed: May 7, 2002

(65) Prior Publication Data

US 2002/0172111 A1 Nov. 21, 2002

(30) Foreign Application Priority Data

May 15, 2001 (TW) ........................................ 90111663 A

(51) Int. Cl.[7] ............................................. G11B 7/005
(52) U.S. Cl. ............................... 369/47.28; 369/53.34; 369/53.15; 369/47.35
(58) Field of Search ........................... 369/44.32, 47.18, 369/47.22, 47.23, 47.28, 47.31, 47.44, 53.12, 53.13, 53.34, 53.35, 59.19, 59.2, 59.22

(56) References Cited

U.S. PATENT DOCUMENTS

| | | | | |
|---|---|---|---|---|
| 4,620,300 A | * | 10/1986 | Ogawa | 369/47.28 |
| 4,872,155 A | * | 10/1989 | Yokogawa et al. | 369/47.28 |
| 6,041,029 A | * | 3/2000 | Iida et al. | 369/47.28 |
| 6,118,393 A | * | 9/2000 | Chiba et al. | 369/59.26 |
| 6,150,888 A | * | 11/2000 | Nakazawa | 369/59.2 |
| 6,536,011 B1 | * | 3/2003 | Jang et al. | 369/47.28 |
| 6,577,569 B1 | * | 6/2003 | Yamamoto et al. | 369/53.32 |
| 2003/0206243 A1 | * | 11/2003 | Kizu | 348/513 |

* cited by examiner

Primary Examiner—Brian E. Miller
Assistant Examiner—Peter Vincent Agustin
(74) Attorney, Agent, or Firm—Birch, Stewart, Kolasch & Birch, LLP

(57) ABSTRACT

A circuit in an optical read/write device for protecting synchronizing patterns is proposed. The protection circuit utilizes a clock with constant frequency as a reference clock. The circuit for protecting synchronizing patterns of this present invention includes a SYNC detector, a frame period counter, a valid-frame-period judgment unit, a frame period memory, a window generator, a real SYNC judgment unit, a SYNC lock judgment unit, and a SYNC signal generator. The circuit counts the pulse number of a reference clock with constant frequency for each frame to get a constant frame period. Then, the circuit can correctly interpolate the lost frame SYNC signal immediately by counting the reference clock, when the disk is defected.

2 Claims, 5 Drawing Sheets

CIRCUIT FOR PROTECTING SYNCHRONIZING PATTERNS

BACKGROUND OF THE INVENTION

A. Field of the Invention

The present invention relates to a circuit in an optical read/write device for protecting synchronizing patterns, which interpolates the correct frame SYNC signal by estimating correct frame periods using a reference clock with fix frequency when defects occur on discs.

B. Description of the Related Art

In the reading processes for conventional optical discs, such as CDs (Compact Discs) and DVDs (Digital Versatile Disk), a laser beam is provided to scan the digital data recorded on the optical discs. Taking the CD for an example, digital data are subjected to an EFM (eight-bit to fourteen-bit modulation) signal arranged in one frame in a given format to be recorded on the CD. Each frame of digital data includes a frame SYNC signal disposed at the head of the frame, a plurality of audio data words, and error correcting bits and consists of 588 channel bits in total. The frame SYNC signal is constituted by 24 channel bits and has a specific variation pattern sufficient to be distinguished from any other digital data.

In a playing system for optical discs, the SYNC signals are used to generate a control signal for dividing frames and dividing digital data in one frame at a given unit. Therefore, the conventional read/write device for optical discs is provided with a SYNC-signal detection circuit. Also, the read/write device further includes a SYNC protecting circuit for protecting synchronizing patterns in combination with the SYNC-signal detection circuit. Accordingly, when defects occur on the discs and thus the SYNC signal is lost, a correct SYNC signal can be interpolated so as not to influence the data decoding.

FIG. 4 is a block diagram of a conventional circuit for protecting synchronizing patterns. As shown in FIG. 4, the circuit for protecting synchronizing patterns, the SYNC signal, uses the output clock (PLCK) of a PLL (Phase locked loop) device as a reference signal to estimate the interval period of the frame. However, when there are defects or scratches on the optical discs, the SYNC signal may be lost or noises may occur. In this case, the output clock of PLL device cannot be locked and a frequency shift may occur, thereby causing a calculation error for the frame SYNC signal.

FIG. 5 is a timing chart showing the frequency of output clock of PLL device shifting downwards due to the lost of SYNC signal or the noise. As shown in FIG. 5, when there are defects on the disc (i.e., the defect signal is H), the frequency of output clock of the PLL device cannot be locked and then the interpolated frame SYNC signal cannot be generated at correct period. Accordingly, the digital data processing will generate an error result. For example, the frame length of each EFM frame is 588T (1 T=I PLCK pulse). When noises occur at the (N+5) frame, the PLL device will generate an error frequency for the PLCK. In this case, the pulse number of the PLCK that are found in a predetermined window may be 560, 540, 520, etc. The correct pulse number of 588 will not be returned until the data is corrected. If data processing is performed according to this error pulse number, the system will generate mistakes in the calculated frame SYNC signal. The SYNC found signal has a constant period only when the data is correct. The real SYNC signal (REAL SYNC) is used to determine whether the found frame SYNC signal period appears repeatedly at a constant period. The In SYNC signal falls down (disable) after the real SYNC signal disappears for a few continuous frames to indicate that the period of the current frame SYNC signal is not correct. The In SYNC signal does not rise (enable) until the continuous pulses of real SYNC signal are found. Correspondingly, the frame SYNC signal is generated according to the real SYNC signal. Thus, when the real SYNC signal is correct, the frame SYNC signal and the real SYNC signal will be generated synchronously. However, when the real SYNC signal is not correct and fails to appear, the frame SYNC signal will still calculate the frame position per 588 pulses of PLCK. As shown in FIG. 5, the pulses of the frame SYNC signal will be shifted gradually at the defect region and will be synchronous with the real SYNC signal again when the real SYNC signal is found. However, due to the PLCK frequency shifted at the defect region, the counting of the frame will be error, for example at the position of (n+13).

SUMMARY OF THE INVENTION

In view of the above-mentioned problems, an object of the invention is to provide a circuit for correctly protecting synchronizing patterns. The circuit corrects the evaluated frame period using a reference clock with constant frequency, and interpolates the SYNC signal in time so as to recover the processing of digital data.

To achieve the above-mentioned object, the circuit for protecting synchronizing patterns of this present invention includes a SYNC detector, a frame period counter, a valid-frame-period judgment unit, a frame period memory, a window generator, a real SYNC judgment unit, a SYNC lock judgment unit, and a SYNC signal generator. The SYNC detector is used to generate a SYNC found signal according to an EFM signal and an output clock PLCK of a PLL device. The frame period counter is used to count the pulse number of a reference clock VCK with constant frequency within each period of the SYNC found signal and outputs a frame period. The valid-frame-period judgment unit judges whether the frame period is normal. The valid-frame-period judgment unit enables an update signal when the frame period is judged as normal. The frame period memory stores the frame period and updates the stored frame period according to the update signal. The window generator searches a legal frame SYNC signal according to the frame period stored in the frame period memory and outputs a searching range. The real SYNC judgment unit detects whether the SYNC found signal is a correct SYNC signal according to the searching range and outputs a real SYNC signal. The SYNC lock judgment unit judges whether the frame period is normal according to the real SYNC signal and outputs an In SYNC signal to the window generator. The SYNC signal generator generates a Frame SYNC signal according to the frame period the valid-frame-period judgment unit and the real SYNC signal.

Accordingly, the interpolated frame SYNC signal will not be influenced even though the output pulse of PLL device is shifted or the SYNC found signal is lost due to disc defects.

DETAIL DESCRIPTION OF THE INVENTION

The circuit for protecting synchronizing patterns in accordance with an embodiment of the present invention will be described in the following with reference to the accompanying drawings.

Figure 1:
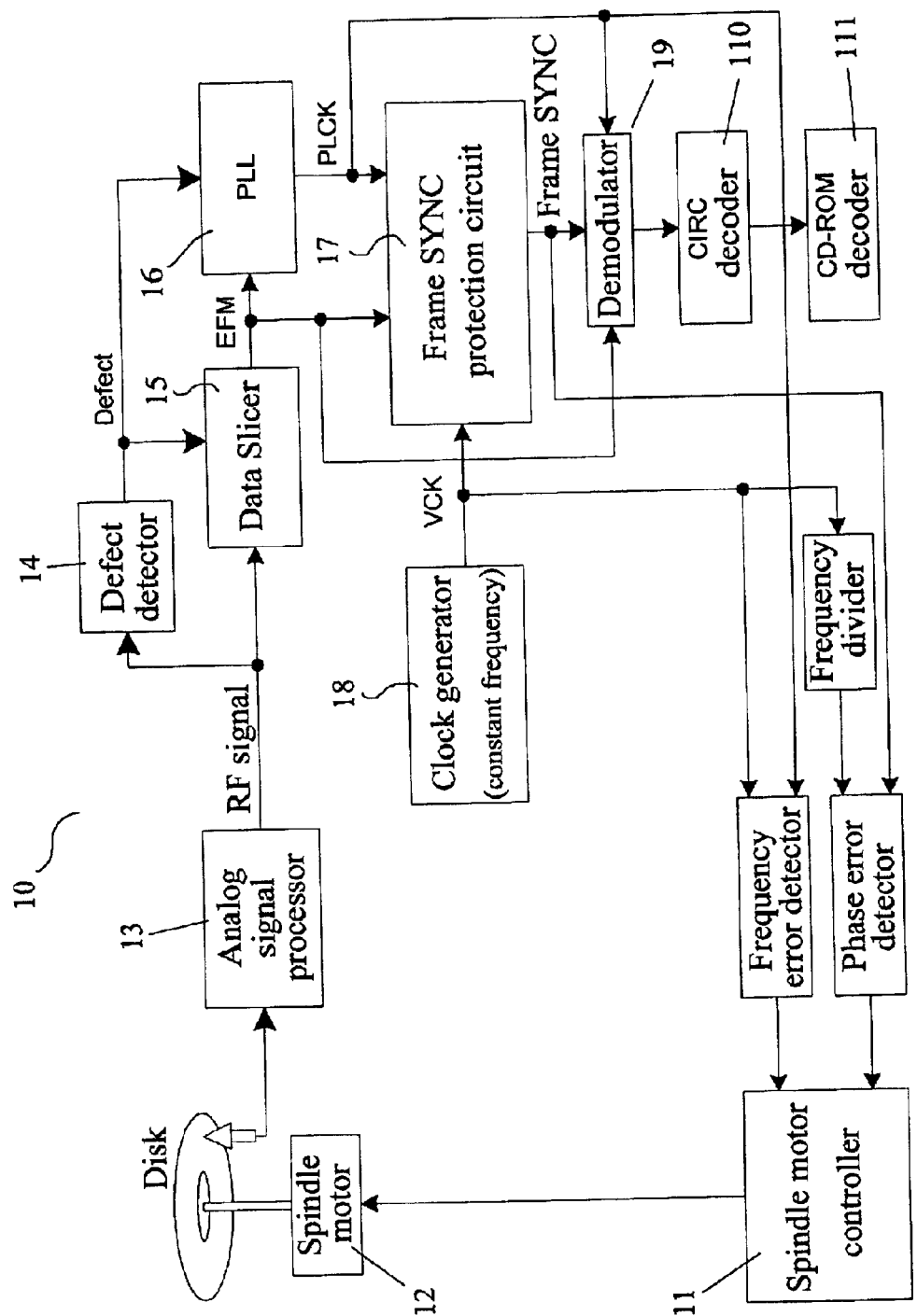
FIG. 1 is a system architecture diagram showing the optical disc read/write device of the invention.

FIG. 1 shows the system block diagram of an optical disc read/write device. An analog signal processor 13 processes the signal read from an optical disc by an optical head to generate an RF signal. When the surface of the optical disc is damaged, the defect detector 14 can detect the defects from the RF signal. For example, the normal RF signal typically has a constant voltage level. If noises are contained in the RF signal, the reflection of the laser beam will be attenuated. Thus, the defect detector 14 can judge the defect state from the voltage level of the RF signal. Consequently, the defect detector 14 is provided for generating a defect signal according to the RF signal. The defect signal is then provided to a data slicer 15 and a phase-locked loop circuit 16 so as to avoid the slicer level shift as well as the shift phenomenon of the output pulse of the PLL circuit when the RF signal has noises or defects.

The data slicer 15 converts the RF signal into a digital signal in the EFM (Eight-to-fourteen modulation) format. The PLL circuit 16 receives the EFM signal and generates a PLL output clock PLCK according to the EFM signal. At the same time, the EFM signal is also sent to the frame SYNC protection circuit 17 to protect synchronizing patterns. The frame SYNC protection circuit 17 will output a correct frame SYNC signal for data decoding and motor speed control.

The clock generator 18 generates the reference clock VCK with constant frequency and the frame SYNC protection circuit 17 uses the reference clock VCK to evaluate the frame period and output the frame SYNC signal. The demodulator 19 extracts the frame data according to the indication signal contained in the SYNC signal. The optical disc read/write device uses a CIRC decoder 110 and a CD-ROM decoder 111 to decode the data and recover the encoded data.

In addition, the reference clock VCK, frame SYNC signal and PLL output clock PLCK are also provided to a motor speed controller 11, thereby the optical disc read/write device can control the rotation speed of a spindle motor 12 according to the CLV (constant leaner velocity) mode.

In the architecture mentioned above, the defect detector 14 and the data slicer 15 can protect and avoid the shift phenomenon of the level in the data slicer 15 caused when noises or defects are found. The lever shift in the data slicer 15 may cause bad initialization for the digital data generated in the sections away from noises. The defect signal from the defect detector 14 is designed to protect the PLL circuit 16. Therefore, the output clock PCLK of PLL circuit 16 is free from being greatly shifted during the occurrence of noises or defects. Thus, it is not necessary to spend a lot of time for the PLL circuit 16 to return the frequency of the output clock PCLK to the correct frequency. In addition, data errors will occur during the tracking state.

Figure 2:
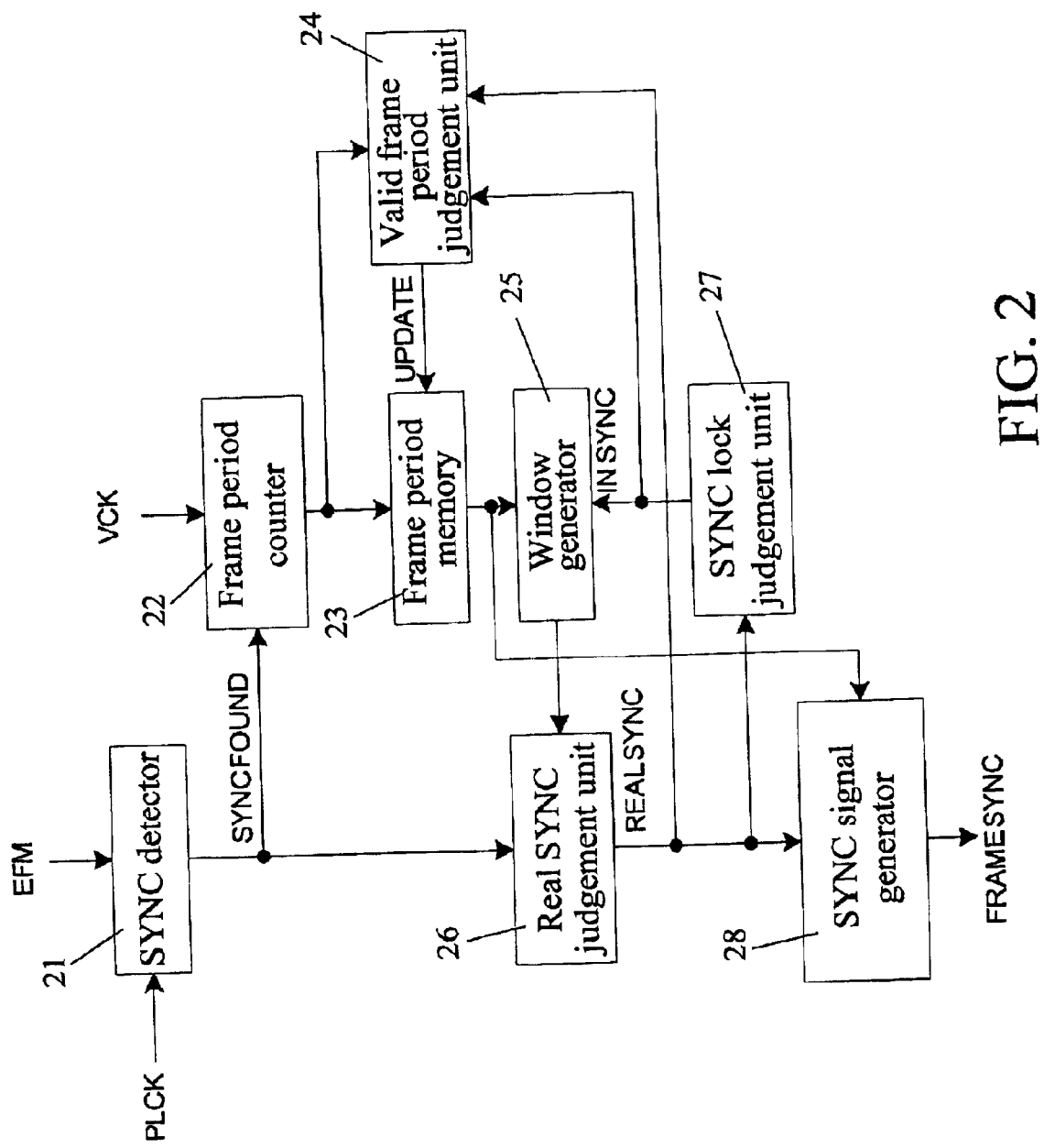
FIG. 2 is a block diagram showing the circuit for protecting synchronizing patterns of the present invention.

FIG. 2 is a functional block diagram showing the circuit for protecting synchronizing patterns of the invention. As shown in this drawing, the SYNC detector 21 detects a SYNC signal from an EFM signal according to the PLL output clock PLCK. That is, if (11T high+11T low+2T high) or (11T low+11T high+2T low) is found or read out, it indicates that the EFM signal contains the pattern of the SYNC signal (Frame Sync clock), and thus a pulse is generated on the SYNC found signal.

Using the reference clock VCK, the frame period counter 22 counts the pulse number of the reference clock VCK between two adjacent pulses on the SYNC found signal. Then, the counted result (pulse number) is stored in the frame period memory 23.

Since the data (pulse number) stored in the frame period memory 23 is not surely correct, a valid-frame-period judgment unit 24 is used to judge whether the current frame period is normal. If the judgment result is normal, an update signal is outputted to the frame period memory 23 to update the record thereof. The valid-frame-period judgment unit 24 is designed for tracking the transient state under the variation of data conversion. If the CAV (constant angular velocity) mode exists, the valid-frame-period judgment unit 24 may be used to update the varying interval period in the frame period memory 23 under the state of slow variation.

Since the frame interval of the SYNC found signal may shift owing to noises, the frame position of the next frame SYNC signal may not be correctly found according to the constant interval period. Accordingly, a window generator 25 is used to enlarge the range of the originally constant interval period so as to find the next SYNC signal and to avoid the misjudgment. The window generator 25 transmits the searching range to the real SYNC judgment unit 26 in order to judge whether the frame SYNC signal is a legal frame SYNC signal. If yes, a pulse on the real SYNC signal is outputted to the SYNC signal generator 28. When the real SYNC signal includes noises or the pulse disappears in the actual frame SYNC signal, the SYNC signal generator 28 interpolates the correct frame SYNC signal according to the information of the real SYNC signal and the frame period. For example, the frame period of the CD is 588T while that of the DVD is 1488T. The SYNC lock judgment unit 27 judges whether the period of the frame SYNC signal is normal according to the condition that whether the frame SYNC signal can be found continuously for a couple of times. If the frame SYNC signal can be found continuously for a couple of times, the period of the frame SYNC signal can be judged as normal and the In SYNC signal is enabled, otherwise the In SYNC signal is disabled. Thus, the IN SYNC signal is transmitted to the window generator 25 and the valid-frame-period judgment unit 24. Only when the IN SYNC signal is enabled continuously for a couple of times, the real SYNC judgment unit 26 accepts the SYNC found signal of the SYNC detector 21 as the real SYNC signal.

Figure 3:
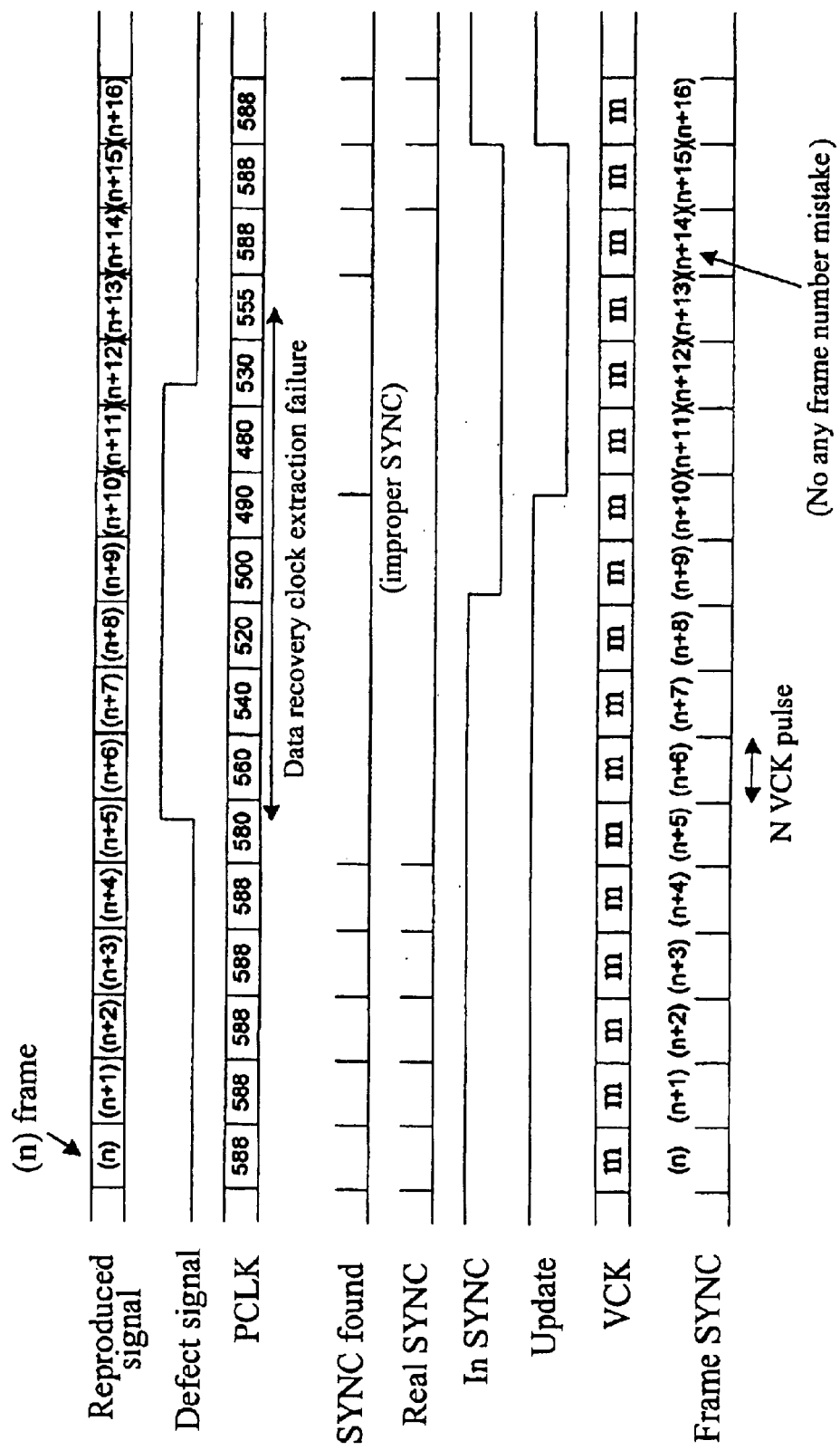
FIG. 3 is a timing chart showing various signals in the circuit for protecting synchronizing patterns of the invention.
Figure 4:
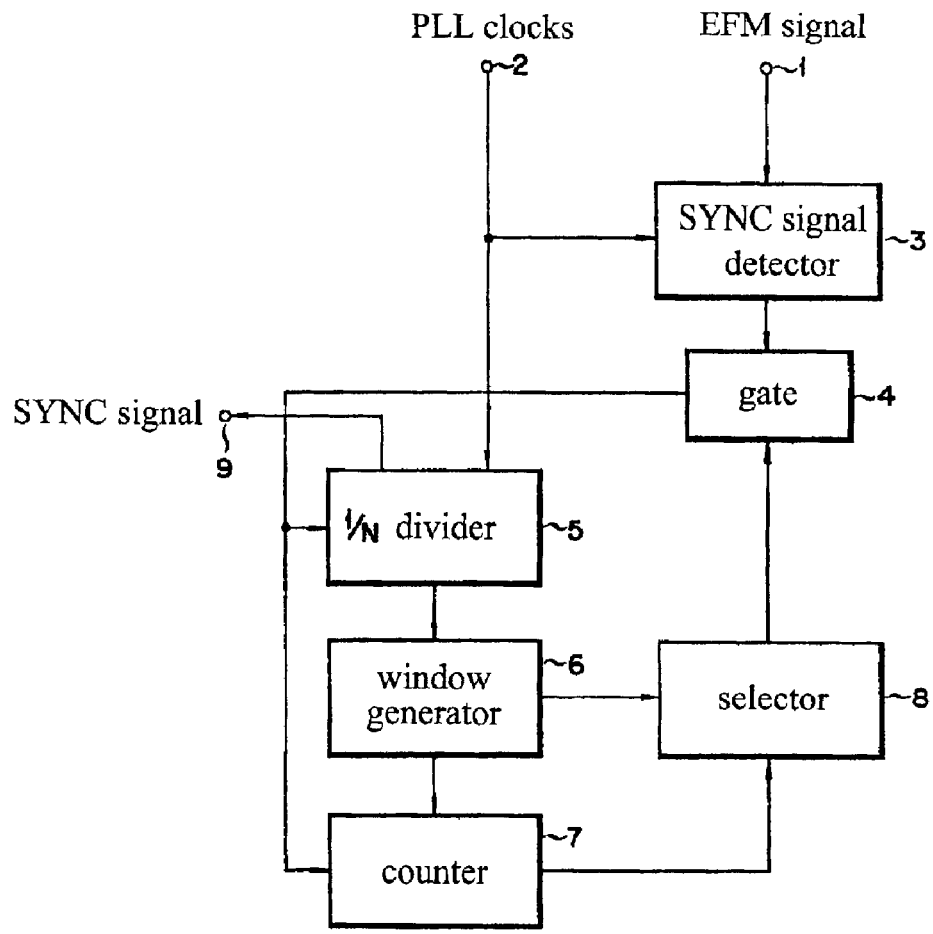
FIG. 4 is a block diagram showing a conventional circuit for protecting synchronizing patterns.
Figure 5:
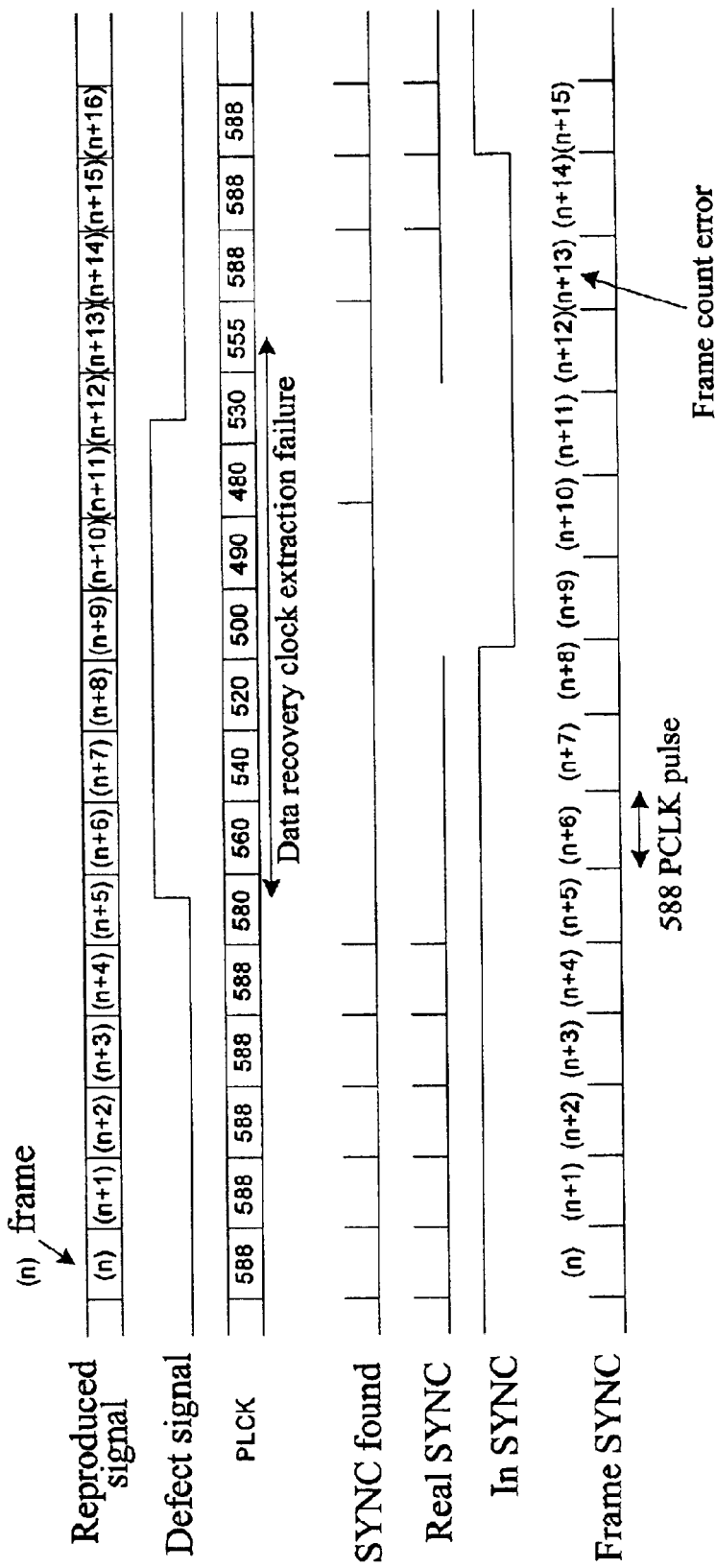
FIG. 5 is a timing chart showing various signals in the conventional circuit for protecting synchronizing patterns.

FIG. 3 is a timing chart showing that the reference clock VCK with constant frequency is used as the period of the reference pulse in this invention. As shown in FIG. 3, the frame length of each EFM frame is 588T. The present invention counts the pulse number of the reference clock VCK for each period of the frame SYNC signal, and the pulse number is m. That is, the period of 588 PLCK pulses equals the period of m VLK pulses. When noises occurs at N+5 frame, since the frequency of the reference clock VCK is constant, the period of the SYNC signal interpolated using the reference clock VCK as a reference pulse is also constant. Therefore, no error occurs in the counting of the frame even when noises occur.

To sum up, utilizing the reference clock with constant frequency, the invention can correctly evaluate the frame number and interpolate the lost frame SYNC signal immediately. Accordingly, the correct digital data processing can generate error-free data. Using the correct frame SYNC signal, it is also possible to further control the rotation speed of the motor as well as the data decoding processes under the constant linear velocity mode and the constant angular velocity mode. In addition, this invention may also be broadly applied to the processing of frame SYNC signal without identification codes (non-ID frame SYNC), such as the processing of CD, and the processing of frame SYNC signal with identification codes (ID frame SYNC), such as the processing of DVD.

What is claimed is:

1. A circuit for protecting synchronizing patterns, which is applied to an optical disc read/write device, the circuit comprising:
   a detector for receiving an EFM signal and detecting the EFM signal and outputting an indicative signal (SYNCFOUND) using a clock (PLCK) outputted from a PLL device;
   a frame period counter for counting pulses of each period of the indicative signal (SYNCFOUND) by using a reference clock with constant frequency and outputting a frame period count;
   a first judgment unit for judging whether the frame period count is normal and outputting a first judgment signal (UPDATE) when said frame period count is judged as normal;
   a memory unit for storing the frame period count and updating the stored frame period count based on the first judgment signal (UPDATE);
   a window generator for outputting a searching range signal by seeking a third judgment signal (INSYNC) based on the frame period count stored in the memory unit;
   a second judgment unit for judging whether the indicative signal (SYNCFOUND) is correct based on the searching range signal and outputting a second judgment signal (REALSYNC);
   a third judgment unit for judging whether the frame period count is normal based on the second judgment signal (REALSYNC) and outputting the third judgment signal (INSYNC) to the window generator;
   a signal generator for generating a synchronization signal (FRAMESYNC) based on the frame period count stored in the memory unit and said second judgment signal (REALSYNC).

2. The circuit for protecting synchronizing patterns according to claim 1, wherein the frequency of the reference clock is the frequency of the output clock of the PLL device at phase-locked state.

* * * * *